N. E. WILSON.
Churn.
No. 54,634.
Patented May 8, 1866.
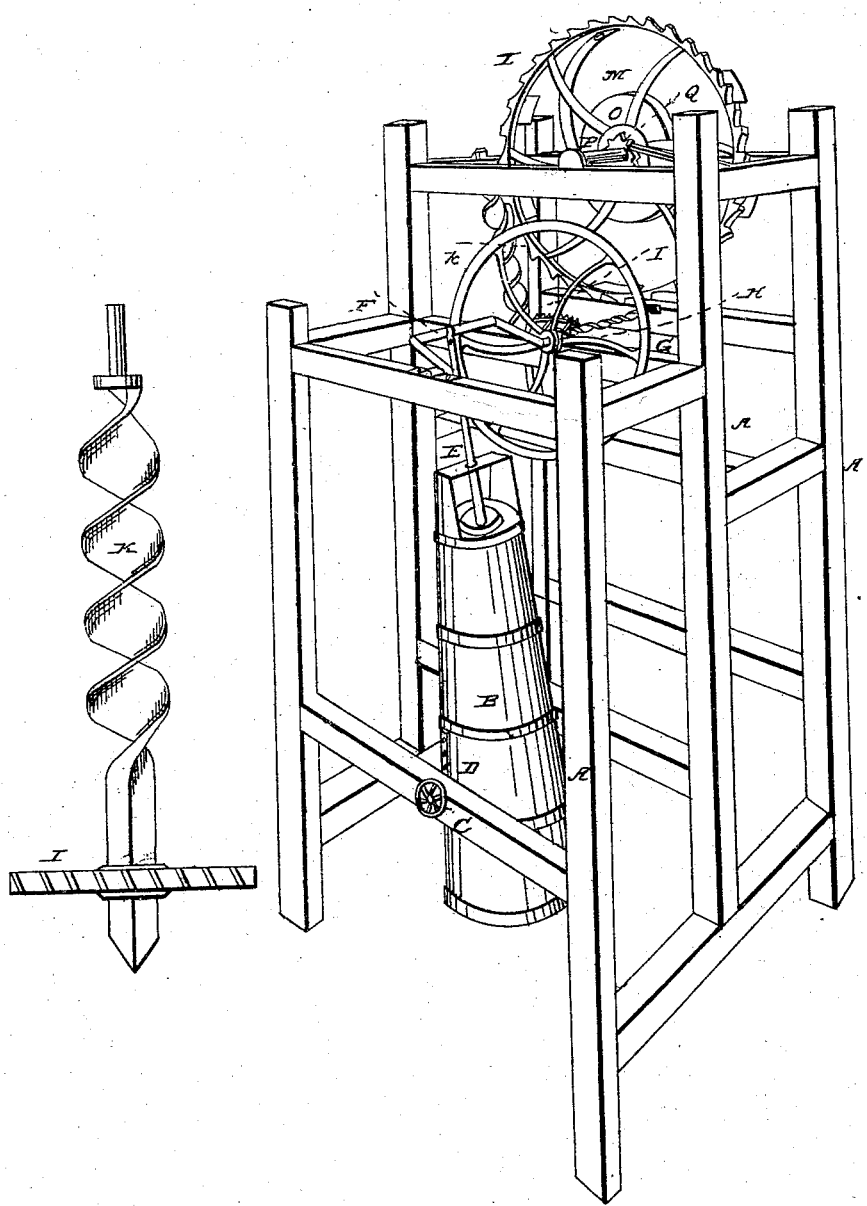

UNITED STATES PATENT OFFICE.

NIMROD E. WILSON, OF CENTRAL STATION, WEST VIRGINIA.

IMPROVEMENT IN CHURNS.

Specification forming part of Letters Patent No. 54,634, dated May 8, 1866.

*To all whom it may concern:*

Be it known that I, NIMROD E. WILSON, of Central Station, in the county of Doddridge and State of West Virginia, have invented a new and useful Improvement in the Mode of Operating Churns, which I style "Wilson's Automatic Churn;" and I do hereby declare that the following is a full, clear, and exact description of the same, reference being had to the annexed drawings, made part of this specification, in which—

Figure 1 is a perspective view, showing the arrangement of the entire apparatus. Fig. 2 is a side elevation of a portion of the machinery; and Fig. 3 is a detached view, showing the mode of connecting the fan-regulator when that is used.

In the different figures the same letters refer to identical parts.

A is the frame, of suitable strength and convenient arrangement for sustaining the entire apparatus.

B is a common churn, which is adjustably suspended on the frame by pivots on each side, one being fixed and the other adjustable, by means of the hand-wheel and screw C. These pivots work in holes in plates D on each side of the barrel, so disposed that the churn may be lowered or raised according to the amount of cream to be churned. On these pivots the churn freely oscillates with the motion of the dasher E, working through the cross-head O and actuated by the crank F, to which it is adjustably united by a strap-joint, hook and catch, or any other convenient means, so that it may be readily attached and detached when desired.

The crank F is impelled by an arrangement of machinery substantially as follows: On the crank-shaft is placed a fly-wheel, G, of suitable proportions. The machinery derives its motion from one or more coiled springs, M, attached at its or their inner ends to the main shaft, and around which it is coiled. This shaft is turned in winding up the machine by a winch like an ordinary clock. It is controlled by the detent Q, which permits it to turn only in one direction. The other extremity of the springs is attached to and near the periphery of the wheel L, which turns freely on the shaft P. On the periphery of the wheel L are spiral cogs working into the threads of the endless screw K, the inclination of the face of the cogs being regulated by that of the fillet of the endless screw. This screw K turns on journals above and below, and on its lower extremity is fastened the wheel I, which has like spiral cogs working on the fillets of an endless screw, which is the shaft H of the crank F.

As the spiral springs must necessarily be of considerable strength, I sometimes double-gear the shaft P, so that in winding up the springs two revolutions of the winch make one of the shaft. The labor of winding up the spring is thus reduced to the capacity of feeble persons.

I so arrange the number of cogs and pitch of the fillets as to give over one hundred revolutions of the crank to one of the wheel L, though this may be varied at pleasure.

I regulate the motion either by a fan-wheel driven from a spur-wheel on the crank-shaft H, as shown in Fig. 3, or by means of a pendulum, according to the familiar application in spring-clocks.

About one thousand revolutions of the crank will, under ordinarily-favorable conditions of temperature, &c., produce butter.

Having thus fully explained this mode of applying my apparatus to a churn, it is only necessary to add that it is equally applicable to a barrel-churn or any other form. I do not claim any particular form of churn, but only the mode of operating a churn.

What I claim as my invention, and seek to secure by Letters Patent, is—

1. Actuating a churn by means of one or more spiral springs communicating motion through wheels M and I and endless screws K and H, substantially in the manner set forth.

2. Giving an oscillating motion to the barrel of a churn by means of the crank F and dasher E, the churn being suspended on pivots, substantially in the manner and for the purpose set forth.

In testimony whereof I have signed my name to this specification in the presence of two subscribing witnesses.

NIMROD E. WILSON.

Witnesses:
JOHN M. DAVIS,
M. O'NEAL.